US011286980B2

(12) United States Patent
Stephan (10) Patent No.: US 11,286,980 B2
(45) Date of Patent: Mar. 29, 2022

(54) ROLLING-ELEMENT BEARING TRANSMISSION

(71) Applicant: Aktiebolaget SKF, Gothenburg (SE)

(72) Inventor: Bernd Stephan, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 1105 days.

(21) Appl. No.: 15/806,446

(22) Filed: Nov. 8, 2017

(65) Prior Publication Data

US 2018/0135694 A1     May 17, 2018

(30) Foreign Application Priority Data

Nov. 17, 2016    (DE) .......................... 102016222689.4

(51) Int. Cl.
| | |
|---|---|
| *F16C 19/46* | (2006.01) |
| *F16H 1/36* | (2006.01) |
| *F16C 33/54* | (2006.01) |
| *F16H 57/08* | (2006.01) |
| *F16H 13/08* | (2006.01) |

(Continued)

(52) U.S. Cl.
CPC .......... *F16C 19/463* (2013.01); *F16C 33/541* (2013.01); *F16H 1/36* (2013.01); *F16H 13/08* (2013.01); *F16H 57/08* (2013.01); *F16C 19/182* (2013.01); *F16C 19/184* (2013.01); *F16C 2322/59* (2013.01); *F16C 2360/31* (2013.01); *F16C 2361/61* (2013.01); *F16H 1/28* (2013.01)

(58) Field of Classification Search
CPC .... F16C 19/463; F16C 33/541; F16C 19/182; F16C 2322/59; F16H 1/36; F16H 13/08
See application file for complete search history.

(56) References Cited

U.S. PATENT DOCUMENTS

| | | | | | |
|---|---|---|---|---|---|
| 4,618,271 | A | * | 10/1986 | Li ......................... | F16C 33/306 384/461 |
| 5,667,455 | A | * | 9/1997 | Suzuki ................ | B60K 17/046 384/512 |

(Continued)

FOREIGN PATENT DOCUMENTS

| | | |
|---|---|---|
| DE | 1500467 A1 | 6/1969 |
| DE | 2235448 A1 | 2/1974 |

(Continued)

OTHER PUBLICATIONS

Office Action from the Japanese Patent Office dated Jun. 30, 2021 in related application No. 2017-220673, and translation thereof.

*Primary Examiner* — Vicky A Johnson
(74) *Attorney, Agent, or Firm* — J-Tek Law PLLC; Scott T. Wakeman; Mark A. Ussai (57) ABSTRACT

A rolling-element bearing transmission includes a first rolled-on element, at least one second rolled-on element and a third rolled-on element. Each of the rolled-on elements has a raceway configured to support a plurality of rolling elements. A first set of rolling elements is disposed between the first rolled-on element and the at least one second rolled-on element and a second set of rolling elements is disposed between the at least one second and the third rolled-on elements. Each of the rolled-on elements comprises or supports at least one transmission element, and the at least one transmission elements are disposed and configured to form a transmission.

17 Claims, 4 Drawing Sheets

(51) Int. Cl.
  *F16C 19/18*  (2006.01)
  *F16H 1/28*  (2006.01)

(56) References Cited

U.S. PATENT DOCUMENTS

2018/0135694 A1\* 5/2018 Stephan .................. F16H 13/08
2018/0231113 A1\* 8/2018 Schulz ...................... F16H 1/32

FOREIGN PATENT DOCUMENTS

| | | | |
|---|---|---|---|
| DE | 112007000565 T5 | 1/2009 | |
| DE | 102010021598 A1 | 12/2011 | |
| DE | 212012000004 U1 | 9/2012 | |
| EP | 2533994 B1 | 4/2015 | |
| FR | 2663090 A1 \* | 12/1991 | ............. F16C 19/55 |
| FR | 2663090 A1 | 12/1991 | |
| JP | H072657 U | 1/1995 | |
| JP | 2009036365 A | 2/2009 | |

\* cited by examiner

ROLLING-ELEMENT BEARING TRANSMISSION

CROSS-REFERENCE

This application claims priority to German patent application no. 10 2016 222 689.4 filed on Nov. 17, 2016, the contents of which are fully incorporated herein by reference.

TECHNOLOGICAL FIELD

The disclosure relates to a rolling-element bearing transmission.

BACKGROUND

In many areas of technology, mechanisms must be designed for carrying out a highest-possible number of cycles of rapid pivoting movements. In particular in connection with a comparatively greatly rotational-speed-reduced drive, the mechanism should simultaneously be durable, robust, simple, and inexpensive.

SUMMARY

An aspect of the disclosure is to provide an improvement in this respect.

The rolling-element bearing transmission according to the disclosure offers the following advantages: the pure rolling-element bearing function per se and the high drive reduction are, so to say, merged in one structural unit. Using such a rolling-element bearing transmission even comparatively small-angled, fast, frequently repeating pivoting movements are realizable, whereas the internal rolling partners are advantageously subjected to a real rotation and not just constantly moved back and forth against one another in a way that is undesired per se, which can cause known problems such as, for example, brinelling. A grease lubrication of the rolling partners can thereby also advantageously be instituted, whereby an expensive oil lubrication is not required. However, this rolling-element bearing transmission can also of course for whatever reason be used and driven in an oil lubricated manner. Furthermore using the disclosed rolling-element bearing transmission large step-ups or reductions of 1:50, 1:100, or even more are achievable. However, the disclosure is thus also particularly suited for industrial robot technology, in particular for the joint regions of robotic arms, where high reductions are required and frequent, rapid pivoting movements are to be carried out over the entire service life. However, they are also suited for pitch adjustment in the blades of wind turbines.

According to an aspect of the disclosure a rolling-element bearing transmission includes an inner rolled-on element having at least one first raceway and a first gear, a sidewall of the first gear forming a portion of the at least one first raceway, a first middle rolled-on element having a second raceway and a second gear, a second middle rolled-on element having a third raceway and a third gear, and an outer rolled-on element having at least one third raceway and a fourth gear. A sidewall of the fourth gear forms a portion of the at least one third raceway. A first set of rolling elements is disposed between the inner rolled-on element and the at least one middle rolled-on element such that the inner rolled-on element and the middle rolled-on element are rotatable relative to each other, and a second set of rolling elements is disposed between the middle rolled-on element and the outer rolled-on element such that the at least one middle rolled-on element and the outer rolled-on element are rotatable with respect to each other. The first gear is meshed with second gear, the third gear is meshed with the fourth gear and the second gear rotates with the third gear. Also, the least one first raceway may comprise two raceways and the at least one third raceway may comprise two raceways.

Further advantages, features, and details of the disclosure arise from the exemplary embodiments of the disclosure described below with reference to the Figures.

DETAILED DESCRIPTION

Figure 1:
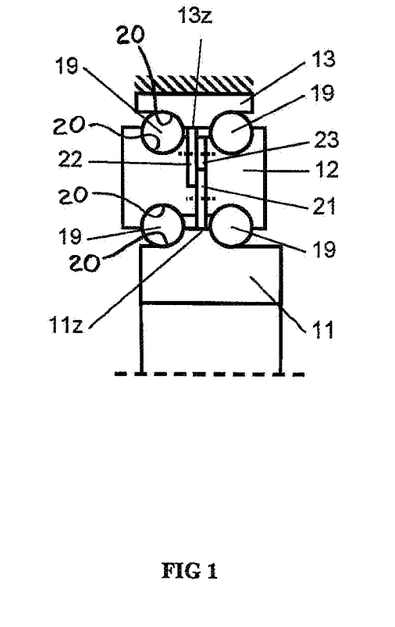
FIG. 1 is a longitudinal section through an upper half of a rolling-element bearing transmission according to the disclosure that includes rolled-on elements disposed one-atop-the-other.

FIG. 1 shows a longitudinal section through an upper half of a rolling-element bearing transmission according to an exemplary embodiment of the disclosure, wherein only the sectional surfaces are depicted without hatching. Here the rolling-element bearing transmission comprises a first inner rolled-on element 11, a second, middle rolled-on element 12, and a third, outer rolled-on element 13, which are all configured ring- or hollow-cylinder-shaped. The outer and the middle rolled-on elements 13 and 12 here are configured with respect to each other in the manner of a double row angular contact ball bearing. Other bearing construction types, for example, deep groove ball bearings and/or tapered roller bearings are of course also usable. Thus the two rolled-on elements 13 and 12 are, for example, formed from a rolling-element bearing steel and comprise, in the region of the two rows of rolling elements formed as balls, hardened, ground, and/or honed or comparably produced raceways 20, on which the balls 19 roll. The balls 19 of each of the two rows here are disposed or snapped-in in a not-depicted cage manufactured, for example, from plastic material, which prevents a mutual contacting of the balls 19. The balls 19 can also be formed from rolling-element bearing steel, but also from other metals—in particular iron alloys, from ceramic, or other suitable materials. Furthermore, the rolling-element space containing the balls 19 is sealed radially outward by two annular seal elements 25 disposed left and right on one of the rolled-on elements 13 or 12, or between the rolled-on elements 13 and 12, wherein they can be contacting seals including a seal lip as well as gap seals, for example, so-called cover plates. The lubrication inside the sealed rolling-element space here is a grease lubrication preferably designed for the entire service life of the bearing transmission.

The middle and the inner rolled-on element 12 and 11 are in turn configured with respect to each other in the manner of a double row angular contact ball bearing such that the embodiment in the preceding paragraph correspondingly applies.

The rolling-element bearing transmission is furthermore configured as follows for realizing the transmission function: the inner rolled-on element 11 is designed as a gear in region 11z. This gear region 11z meshes with a first gear 21 that is rotatably supported in the middle rolled-on element 12. The outer rolled-on element 13 is designed as an internally geared hollow gear in region 13z. This gear region 13z meshes with a second gear 22 that is also rotatably supported in the middle rolled-on element 12. Furthermore, together with the second gear 22 a third gear 23 is rotatably disposed in the middle rolled-on element 12, wherein the second and third gear 22 and 23 are connected to each other such that they rotate together, for example by being configured one-piece and uniform in terms of material as a double gear. The rolling-element bearing transmission can further comprise first, second, and third gears supported in the middle rolled-on element 12, which is described later in more detail with respect to FIG. 2; however, this can initially be left out for the further functional description of the rolling-element bearing transmission.

Since the gears 21, 22, and 23 as well as the gear regions 11z and 13z are disposed, so to say, between the left and right rolling-element rows, like the balls 19 they lie inside the outwardly sealed and grease-lubricated rolling-element spaces. This has a favorable effect on the gear operation and the support of the gears 21, 22, and 23 inside the middle rolled-on elements 12, since a lubricating of the gear bearing assemblies and the tooth meshings would in any case be necessary. Furthermore, the arrangement of the gear regions 11z and 13z between the left and right raceways for the balls 19 is favorable, since with an already necessary hardening of the raceways the gear regions 11z and 13z lying therebetween can be identically hardened as well, since starting from a certain degree of load the teeth would have to have been hardened anyway. This is also true for the teeth of the gears 21, 22, and 23, provided they are formed from a hardenable material, e.g., a hardenable steel. Finally, due to the gears 21, 22, and 23 disposed and supported in its center, the middle rolled-on element 12 is constructed at least initially two-piece from a left and a right ring, wherein the rings are connectable to each other in a fixed manner. For example, the two rings with the integrated gears 21, 22, and 23 and their bearing assemblies, all parts can be rigidly screwed to each other by a screw connection. The bearing assemblies of the gears 21, 22, and 23 can be constructed in a space-saving manner on a bolt by needle bearings or needle roller and cage assemblies or by sliding bearings. The gears 21, 22, and 23 can also be attached axially adjacent to the bearing assembly instead of between the two raceways.

In the exemplary embodiment, the outer rolled-on element 13 may be attached to a housing and thus provides a relatively fixed frame of reference for the other rolled-on elements 12 and 11. The driving is effected, for example, via an electric drive motor on the middle rolled-on element 12, and the output is effected via the inner rolled-on element 11 after the driving has undergone a significant reduction on the way to the output side. The electric motor can be combined with the transmission very cheaply and without wear without a further bearing assembly. For this purpose a tubular rotor is attached to the drive side at the middle rolled-on element 12 of the rolling-element bearing transmission, and the stator of the electric motor is attached on the same side at the outer rolled-on element 13. Both a safety brake and a rotation angle sensor can be attached on the side of the electric motor facing away from the transmission.

Here the reduction is configured three-stage as a differential transmission, wherein in each of the three stages a step-up or reduction takes place that also arises from the diameter ratio of the gears, or their tooth ratios, interacting in the respective stage. In the first stage a step-up of the rotational speed of the driven central rolled-on element 12 takes place via the stationary hollow gear region 13 on the outer rolled-on element 13 to the rotational speed of the second gear 22 about its own axis. The diameter ratio between the second gear 22 and the hollow gear region 13z can—always depending on the space available for the rolling-element bearing transmission—be set, for example, to 1:4. In the second stage, from the third gear 23, which is already connected on an axis for conjoint rotation with the second gear 22 and thus rotates therewith, to the first gear 21 a diameter ratio of 50 mm to 25 mm, i.e., of 1:2 or more is set, for example. Also in the third stage a reduction of 1:2, e.g., 50 mm to 100 mm, can be achieved from first gear 21 to the gear region 11z of the inner rolled-on element 11, so that together a step-up of zero results as differential. This means that the outer and the inner rolled-on element 13 and 11 do not rotate with any rotational speed of the middle rolled-on element. Step-up and reduction cancel out to zero. By slight change of the diameter and translation of the gears, high translation ratios of greater than 1:50 can thus be achieved in both directions of rotation between driven and output rolled-on element 11, 12, and/or 13.

Thus high reductions can be achieved with this arrangement with the advantage that all parts rotate, and thus with the advantage of good lubrication conditions. If the three-stage reduction depicted is not sufficient, of course a reduction having more stages can be used, wherein rolling-element bearing transmissions having more than three rolled-on elements are also possible; however, even a two-stage translation, for example, by omitting the third gear, may be sufficient.

Using the rolling-element bearing differential transmission, even comparatively small-angled pivot movements can thus also be achieved between the inner rolled-on element 11 and the outer rolled-on element 13 with a large reduction ratio that is favorable in terms of driving technology, wherein the rolling partners used are at the same time advantageously subjected to an actual rotation and not just constantly moved back and forth in a way that is undesired per se, which can cause known problems such as, for example, brinelling. A grease lubrication of the rolling partners can thereby also advantageously be instituted, whereby an expensive oil lubrication is not required. However, the rolling-element bearing transmission of the disclosure can also of course for whatever reason be used and driven in an oil lubricated manner.

However, the disclosure is thus also particularly suited for robot technology, in particular for the joint regions of robotic arms, where high reductions are required and sustained pivoting movements also must be carried out.

Figure 2:
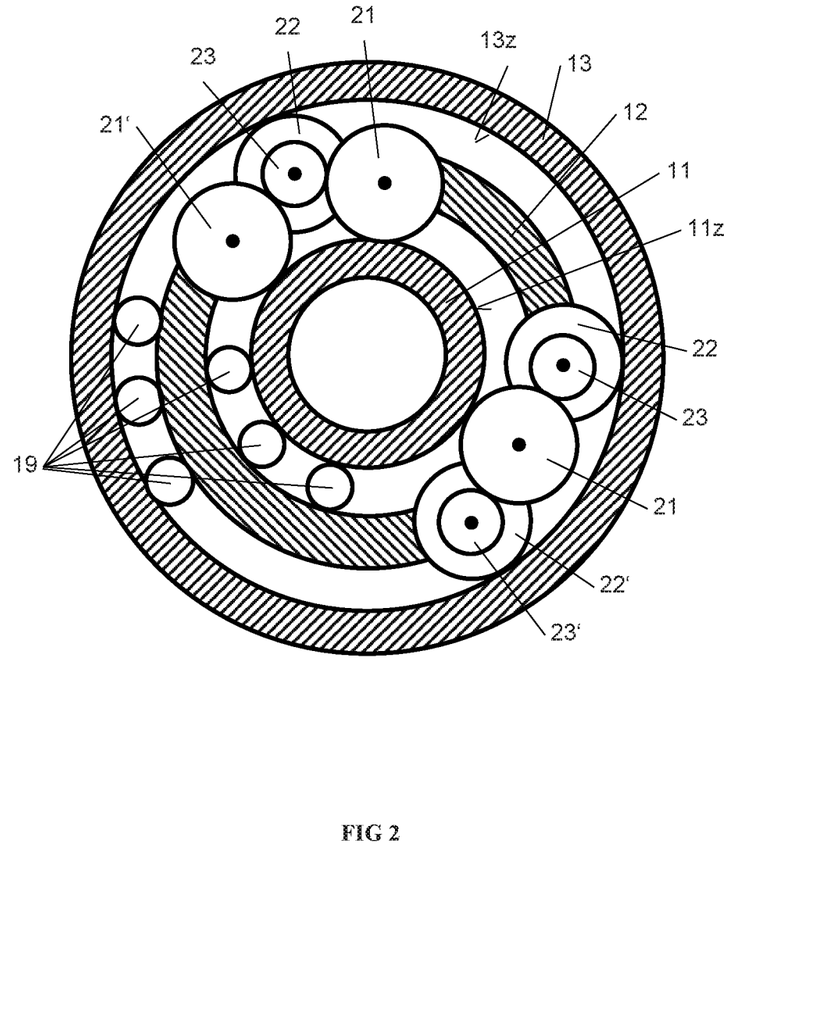
FIG. 2 is a cross-section through a rolling-element bearing transmission similar to that of FIG. 1.

FIG. 2 shows a cross-section through a rolling-element bearing transmission similar to that of FIG. 1. Here the section is guided approximately in the region of the horizontal center of the rolling-element bearing transmission of FIG. 1. The rolling-element bearing transmission of FIG. 2 essentially differs from that of FIG. 1 by a dimensioning of the individual structural elements. Components that are functionally identical in principle are indicated in FIG. 2 by the same reference numbers as in FIG. 1. The embodiment for FIG. 1 also continues to correspondingly apply in FIG. 2 with respect to the functionality. For the sake of clarity only a small number of balls 19 are exemplarily depicted in FIG. 2. Here FIG. 2 shows in the upper 11 o'clock region a first principle embodiment, and in the right 4 o'clock region a second principle embodiment of the disclosure.

In said 11 o'clock region a further first gear 21' corresponding to the first gear 21 is provided in addition to the gears 21, 22, and 23 described in FIG. 1. Like the first gear 21, this further first gear 21' meshes on the one hand with the third gear 23 and on the other hand with the gear region 11$z$ on the inner rolled-on element 11. Here this group of four gears 21, 21', 22, and 23 is provided repeatedly distributed, for example, three times, on the rolling-element bearing transmission in the circumferential direction. Using this design a high torque transmission capability from the first gears 21 and 21' to the gear region 11$z$ is advantageously achievable, which ensures, for example, a consistently good and high torque transmission in the drive-output constellation described for FIG. 1.

In said 4 o'clock region further second and third gears 22' and 23' corresponding to the second and third gears 22 and 23 are provided in addition to the gears 21, 22, and 23 described in FIG. 1. Like the second gear 22, the further second gear 22' meshes with the gear region 13$z$ on the outer rolled-on element 13. Like the third gear 23, the further third gear 23' meshes with the first gear 21. Here this group of five gears 21, 22, 22', 23, and 23' is repeatedly distributed, for example, three times, on the rolling-element bearing transmission in the circumferential direction. This embodiment also offers a particular torque transmission capability deviating from the first embodiment, which can be used with particular advantage depending on the respective drive-output constellation. Of course combinations of the first and second embodiments described above are also usable in other embodiments.

Of course rolling elements other than balls, for example, tapered or cylindrical rollers, are also possible in other embodiments. Furthermore, of course, for example, single row or even more-than-double row rolling-element bearing assemblies are possible depending on application requirement. Finally, in principle it can also be freely chosen via which of the rolled-on elements is to be driven and provide output.

Figure 3:
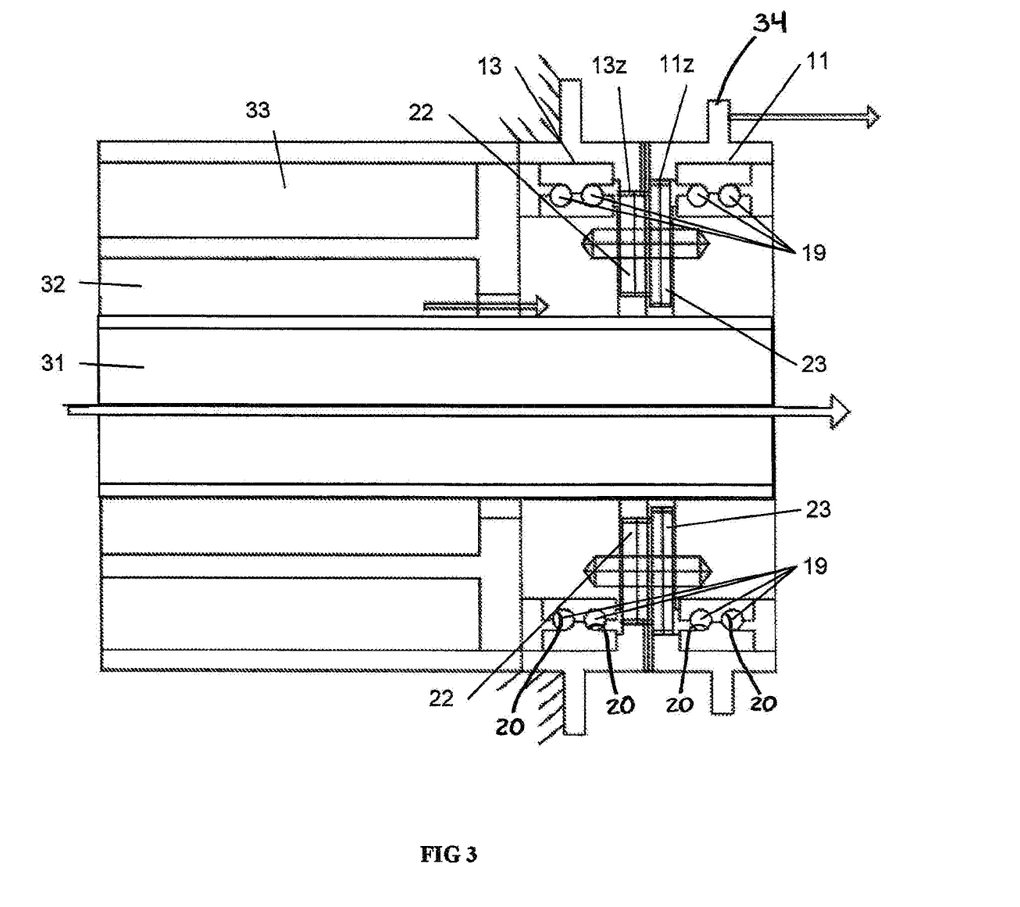
FIG. 3 is a longitudinal section through a rolling-element bearing transmission according to the disclosure that includes two axially adjacent rolled-on elements.

As a further exemplary embodiment of the disclosure FIG. 3 shows a longitudinal section through a rolling-element bearing transmission, wherein only the section surfaces are depicted without hatching. Components that are functionally identical in principle are indicated in FIG. 3 by the same reference numbers as in FIGS. 1 and 2. The embodiment for FIGS. 1 and 2 also correspondingly applies in FIG. 3 with respect to the functionality. Unlike in FIGS. 1 and 2, in the rolling-element bearing transmission of FIG. 3 the three rolled-on elements 11, 12, and 13 are not disposed one-atop-the-other in the manner of a three-ring bearing, but rather the first and third rolled-on elements 11 and 13 are disposed axially adjacent to each other.

Figure 4:
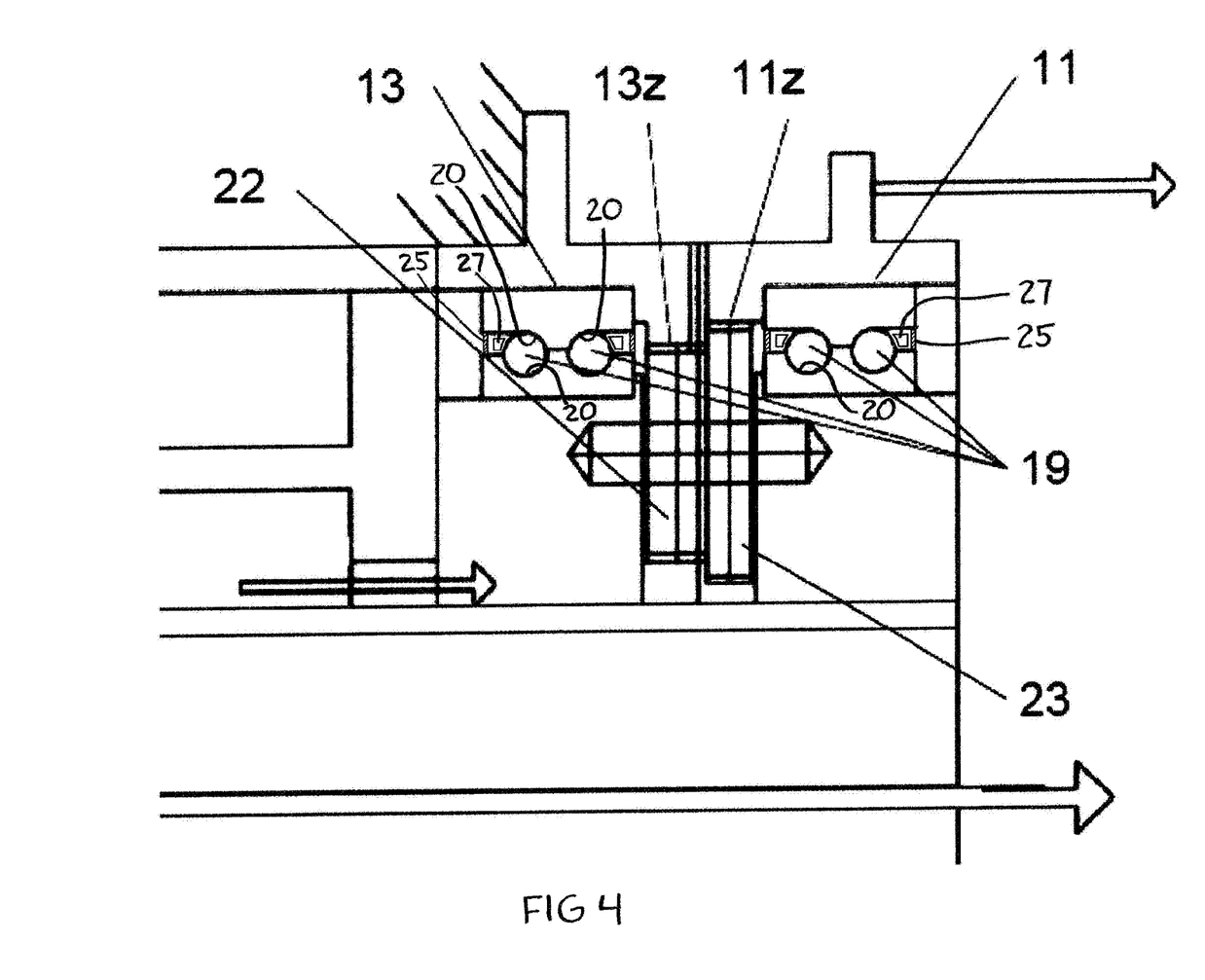
FIG. 4 is a broken-away, enlarged view of a portion of FIG. 3, showing seals and cages in the rolling-element bearing transmission according to FIG. 3.

In FIGS. 3 and 4, the first and the third rolled-on element 11 and 13 are configured at least two-piece, wherein one of the pieces that includes the raceways 20 for the balls 19 is a common outer ring of a double row angular contact ball bearing. The second rolled-on element 12 is configured multi-piece, wherein two of the pieces that include the raceways 20 for the balls 19 are common inner rings for double row angular contact ball bearings. Preferably, the rolling-element transmission includes sealing elements 25 sealing a grease-filled space around the first and second sets of rolling elements 19 and at least one cage 27 containing the first and/or second sets of rolling elements 19. Due to this design essentially off-the-shelf double row angular contact ball bearings can advantageously be used.

A plurality of pairs of gears 22 and 23, distributed in the circumferential direction and rotatably supported in the rolled-on element 12 are provided inside the second rolled-on element 12 and axially between the two angular contact ball bearings. In each pair the two gears 22 and 23 are fixedly connected to each other. The gears 22 are disposed and configured such that they mesh with an internally geared gear region 13$z$ formed on the third rolled-on element 13, whereas the gears 23 are disposed and configured that they mesh with an internally geared gear region 11$z$ on a first rolled-on element 11.

The second rolled-on element 12 sits on a hollow shaft 31. Furthermore a rotor 32 of an electric motor is connected to the hollow shaft, wherein the stator 33 of the electric motor is connected to the third rolled-on element 13 that is fixed relative to the others. The hollow shaft 31 and the second rolled-on element connected thereto are thus drivable via the electric motor, wherein the output is effected via the first rolled-on element.

Here the rolling-element bearing transmission of FIG. 3 steps up from drive to output as follows: The gear 22 meshing with the gear region 13$z$ of the third rolled-on element 13 is set into a rotation about its own axis of rotation by the rotating of the hollow shaft 31. Thus the gears 23 are also rotated along, whose rotation moves the first rolled-on element 11 by their meshing with the gear region 11$z$ of the first rolled-on element 11.

Similarly as described for the arrangement of FIG. 1, of course in the arrangement of FIG. 3 as needed a brake not depicted in more detail, also sensors not depicted in more detail for capturing different values as well as other extension elements can be added on the side of the electric motor facing away from the transmission.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing transmissions.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:
1. A rolling-element bearing transmission, comprising:
  a first rolled-on element, at least one second rolled-on element and a third rolled-on element, each one of the first, at least one second and third rolled-on elements having at least one raceway,
a first set of rolling elements disposed between the first rolled-on element and the at least one second rolled-on element such that the first rolled-on element and the at least one second rolled-on element are rotatable relative to each other, and
a second set of rolling elements disposed between the at least one second and third rolled-on elements such that the at least one second rolled-on element and the third rolled-on element are rotatable with respect to each other,
wherein each of the first, at least one second and third rolled-on elements comprises or supports at least one transmission element,
wherein the at least one transmission element of the first rolled-on element and the at least one transmission element of the at least one second rolled-on element and the at least one transmission element of the third rolled-on element are disposed and configured to form a transmission,
wherein the first rolled-on element and the third rolled-on element are spaced axially apart and the at least one second rolled-on element includes at least two raceways on a same radial side of the least one second rolled-on element, and
wherein the first and second set of rolling elements and the first and at least one second rolled-on elements are configured as a double row angular contact ball bearing.

2. The rolling-element bearing transmission according to claim 1, wherein the first and/or second set of rolling elements comprise a single set of rolling element or a multi-row set of rolling elements.

3. The rolling-element bearing transmission according to claim 2, wherein the roiling elements comprise balls.

4. The rolling-element bearing transmission according to claim 1, including seal elements sealing a grease-filled space around the first and second sets of rolling elements.

5. The rolling-element bearing according to claim 4, including at least one cage containing the first and/or second sets of rolling elements.

6. The rolling-element bearing transmission according to claim 1, wherein a drive is operably connected a first one of the first, at least one second and third rolled-on elements, an output element is connected to a second one of the first, at least one second and third rolled-on elements, and the third one of the first, at least one second and third rolled-on elements constitutes a fixed frame of reference.

7. The rolling-element bearing transmission according to claim 1, wherein the transmission element comprises an internal gear or an external gear.

8. The roiling-element hearing transmission according to claim 7, wherein the gear is a single gear or a multiple gear.

9. The rolling-element bearing transmission according to claim 7, wherein the at least one second rolled-on element is multi-part and supports a double gear, and the first and the third rolled-on elements each comprise a gear.

10. The rolling-element bearing transmission according to claim 9, wherein the at least one second rolled-on element supports a further gear interacting with the at least one gear.

11. The rolling-element bearing transmission according to claim 7, wherein a plurality of groups of the gears are supported on the at least one second rolled-on element and distributed in the circumferential direction of the second rolled-on element.

12. The rolling-element bearing transmission according to claim 1, wherein the at least one second rolled-on element includes two raceways on a same side of the at least one second rolled-on element or on different, opposing sides of the at least one second rolled-on element.

13. The rolling-element bearing transmission according to claim 1, wherein the at least one transmission element of at least one of the first rolled-on element, the at least one second rolled-on element and the third rolled-on element comprise at least one lateral side and wherein the at least one lateral side forms a raceway of the at least one of the first, the at least one second and the third rolled-on elements.

14. The rolling-element beating transmission according to claim 1, wherein the at least one transmission element of the first rolled-on element includes a first gear, the at least one transmission element of the at least one second rolled-on element includes a second gear and a third gear, and the at least one transmission element of the third rolled-on element includes a fourth gear, wherein the first gear is meshed with second gear, the third gear is meshed with the fourth gear and the second gear rotates with the third gear.

15. A rolling-element bearing transmission, comprising:
a first rolled-on element, at least one second rolled-on element and a third rolled-on element, each one of the first, at least one second and third rolled-on elements having at least one raceway,
a first set of rolling elements disposed between the first rolled-on element and the at least one second rolled-on element such that the first rolled-on element and the at least one second rolled-on element are rotatable relative to each other, and
a second set of roiling elements disposed between the at least one second and third rolled-on elements such that the at least one second rolled-on element and the third rolled-on element are rotatable with respect to each other,
wherein each of the first, at least one second and third rolled-on elements comprises or supports at least one transmission element,
wherein the at least one transmission element of the first rolled-on element and the at least one transmission element of the at least one second rolled-on element and the at least one transmission element of the third rolled-on element are disposed and configured to form a transmission,
wherein the transmission element comprises an internal gear or an external gear and the at least one second rolled-on element is multi-part and supports a double gear, and the first and the third rolled-on elements each comprise a gear.

16. A rolling-element bearing transmission, comprising:
a first rolled-on element, at least one second rolled-on element and a third rolled-on element, each one of the first, at least one second and third rolled-on elements having at least one raceway,
a first set of rolling elements disposed between the first rolled-on element and the at least one second rolled-on element such that the first rolled-on element and the at least one second rolled-on element are rotatable relative to each other, and
a second set of rolling elements disposed between the at least one second and third rolled-on elements such that the at least one second rolled-on element and the third rolled-on element are rotatable with respect to each other, wherein each of the first, at least one second and third rolled-on elements comprises or supports at least one transmission element, wherein the at least one transmission element of the first rolled-on element and the at least one transmission element of the at least one second rolled-on element and the at least one transmission element of the third rolled-on element are disposed and configured to form a transmission, and wherein the first rolled-on element and the third rolled-on element are spaced axially apart and the at least one second rolled-on element is multi-piece, the multi-pieces of the second rolled-on element being spaced axially apart.

17. A rolling-element bearing transmission, comprising:

a first rolled-on element, at least one second rolled-on element and a third rolled-on element, each one of the first, at least one second and third rolled-on elements having at least one raceway, a first set of rolling elements disposed between the first rolled-on element and the at least one second rolled-on element such that the first rolled-on element and the at least one second rolled-on element are rotatable relative to each other, and a second set of rolling elements disposed between the at least one second and third rolled-on elements such that the at least one second rolled-on element and the third rolled-on element are rotatable with respect to each other, and seal elements sealing a grease-filled space around the first and second sets of rolling elements, wherein each of the first, at least one second and third rolled-on elements comprises or supports at least one transmission element, wherein the at least one transmission element of the first rolled-on element and the at least one transmission element of the at least one second rolled-on element and the at least one transmission element of the third rolled-on element are disposed and configured to form a transmission, and wherein the first rolled-on element and the third rolled-on element are spaced axially apart and the at least one second rolled-on element includes at least two raceways on a same radial side of the least one second rolled-on element.

\* \* \* \* \*